United States Patent
Shatsky et al.

(10) Patent No.: US 9,332,476 B2
(45) Date of Patent: May 3, 2016

(54) METHOD AND APPARATUS TO CORRECT INDOOR POSITIONING BY UTILIZING WI-FI HANDOVERS

(71) Applicant: BlackBerry Limited, Waterloo (CA)

(72) Inventors: Alexander Shatsky, Vaughan (CA); Alexandre Kouznetsov, Waterloo (CA)

(73) Assignee: BlackBerry Limited, Waterloo (CA)

( * ) Notice: Subject to any disclaimer, the term of this patent is extended or adjusted under 35 U.S.C. 154(b) by 256 days.

(21) Appl. No.: 14/045,858

(22) Filed: Oct. 4, 2013

(65) Prior Publication Data
US 2015/0098442 A1 Apr. 9, 2015

(51) Int. Cl.
*G01C 21/00* (2006.01)
*H04W 36/32* (2009.01)
*G01C 21/16* (2006.01)
*G01C 21/20* (2006.01)
*G01S 5/02* (2010.01)
*H04W 64/00* (2009.01)
*H04W 4/02* (2009.01)
*H04W 4/00* (2009.01)
*G01S 19/48* (2010.01)
*H04W 36/08* (2009.01)

(52) U.S. Cl.
CPC .......... *H04W 36/32* (2013.01); *G01C 21/165* (2013.01); *G01C 21/206* (2013.01); *G01S 5/0263* (2013.01); *H04W 64/00* (2013.01); *G01S 19/48* (2013.01); *H04W 4/008* (2013.01); *H04W 4/02* (2013.01); *H04W 36/08* (2013.01)

(58) Field of Classification Search
CPC .......................... H04W 64/003; H04W 64/006
USPC .............. 701/400–412, 468–472; 340/539.13
See application file for complete search history.

(56) References Cited

U.S. PATENT DOCUMENTS

| | | | | |
|---|---|---|---|---|
| 5,896,373 | A * | 4/1999 | Mitts et al. ..................... | 370/331 |
| 8,204,684 | B2 * | 6/2012 | Forstall et al. ................. | 701/433 |
| 8,355,862 | B2 * | 1/2013 | Matas et al. ................... | 701/408 |
| 8,369,867 | B2 * | 2/2013 | Van Os et al. ............... | 455/456.1 |
| 8,462,745 | B2 | 6/2013 | Alizadeh-Shabdiz | |
| 8,644,843 | B2 * | 2/2014 | Canon et al. ................ | 455/456.1 |
| 8,781,442 | B1 * | 7/2014 | Link, II ................... | G08G 1/205 370/338 |
| 2005/0265321 | A1 * | 12/2005 | Rappaport et al. ............ | 370/352 |
| 2006/0072532 | A1 * | 4/2006 | Dorenbosch et al. ......... | 370/342 |
| 2010/0285815 | A1 * | 11/2010 | Treu et al. ................... | 455/456.1 |
| 2010/0330991 | A1 | 12/2010 | Sydir et al. | |
| 2012/0133555 | A1 * | 5/2012 | Hyun ..................... | G01S 5/0236 342/357.31 |
| 2013/0018629 | A1 | 1/2013 | Sidhu et al. | |
| 2013/0045759 | A1 * | 2/2013 | Smith ........................ | 455/456.6 |
| 2013/0054130 | A1 | 2/2013 | Ye et al. | |
| 2014/0302852 | A1 * | 10/2014 | Ostergaard et al. ........... | 455/436 |
| 2015/0097731 | A1 * | 4/2015 | Russell ......................... | 342/450 |
| 2015/0133148 | A1 * | 5/2015 | Yang ................. | G06F 17/30289 455/456.1 |

OTHER PUBLICATIONS

Skyhook: Location Technology>Core Engine Performance Website. http://skyhookwireless.com/location-technology/performance.php, 2013 Skyhook Wireless, Inc.
Communications Security, Reliability and Interoperability Council. Report-Leveraging LBS and Emerging Location Technologies for Indoor Wireless E9-1-1. Working Group 3 E9-1-1 Location Accuracy. Mar. 14, 2013.
European Patent Office, Office Action, Application No. 14187390.1-1557, Feb. 18, 2015.

* cited by examiner

*Primary Examiner* — Thai Hoang
(74) *Attorney, Agent, or Firm* — Moffat & Co.

(57) ABSTRACT

A system and method may dynamically correct the dead reckoning (DR) position of a mobile device. An indoor or outdoor venue may have Access Points (APs) dispersed around its interior. Each time that a mobile device experiences a handover from one AP to a new AP, the mobile device and/or the local network associated with the venue may determine whether or not the mobile device's DR position corresponds to the location of the new AP. If the mobile device's DR position does not correspond to the location of the new AP within a predetermined threshold, then the mobile device's DR position may be updated to a position associated with the new AP. As a result, the DR position of the mobile device may be continuously checked, and if need be, corrected at each AP handover associated with the venue. The APs may be Wi-Fi/WLAN APs, eNodeB's, or other APs.

20 Claims, 7 Drawing Sheets

METHOD AND APPARATUS TO CORRECT INDOOR POSITIONING BY UTILIZING WI-FI HANDOVERS

FIELD

The present embodiments relate generally to navigation techniques employed by mobile devices. More particularly, the present embodiments relate to indoor navigation techniques.

BACKGROUND

GPS-based positioning and navigation methods have been demonstrated to be effective for mobile device applications. Still, there are some challenges to apply the same approach to the indoor environment, which may be primarily due to the significantly degraded or unreliable GPS signals received inside of buildings.

Conventional approaches to indoor navigation may use a mobile device's embedded sensors, such as an accelerometer, gyro, magnetometer, etc. While efforts may have improved the sensors' hardware and developed algorithms for sensors data filtering, sensors-based dead reckoning may provide relatively accurate navigation for only a short period of time (usually less than a few minutes).

In general, dead reckoning (DR) may involve calculating one's current position by using a previously determined position (or fix), and advancing that position based upon estimated/known course and estimated/known speed over elapsed time. However, dead reckoning is subject to cumulative errors. As dead reckoning is running for a long interval, errors may accumulate that derive from gyro drift, magnetometer inference, a mix of user moving acceleration with gravity acceleration, and/or other types of sensor-based errors. The present embodiments may, inter alia, overcome these and other deficiencies.

BRIEF SUMMARY

The present embodiments disclose an apparatus and method that may dynamically adjust or change the dead reckoning (DR) position/location of a mobile device when Global Navigation Satellite System (GNSS) signals, such as Global Positioning System (GPS) or other satellite positioning signals, are unreliable, such as in indoor locations. A venue, such as a shopping mall, office building, stadium, hotel, meeting hall, convention center, school, university, etc., may have a number of wireless Access Points (APs) (such as Wi-Fi APs, WLAN (wireless local area network) APs, Long Term Evolution (LTE) eNodeB's, home eNodeB's, other LTE APs, etc.), dispersed around its interior. Each time that a mobile device experiences a handover from one AP to the next or a new AP, the mobile device and/or a local network controller associated with the venue may determine whether or not the mobile device's dead reckoning (DR) position corresponds to a location of, or associated with, the new AP. If the mobile device's DR position does not correspond to the location of, or associated with, the new AP within a predetermined threshold, then a correction may be initiated. For instance, the mobile device's DR position may be updated to a position associated with the new AP, such as a real-world location at which handover was expected to approximately occur at. As a result, during use, the DR position of the mobile device may be continuously checked, and if need be, corrected at each AP handover within the venue (and/or when GPS or other satellite positioning signals may be unreliable and/or degraded).

In one aspect, a computer-implemented method of mobile device indoor and/or outdoor navigation may be provided. The method may include, during a handover of a mobile device from one Wi-Fi (or other type of interior) AP (Access Point) to a next Wi-Fi (or other type of interior) AP: (1) determining whether a dead reckoning (DR) current position of the mobile device is within a radius of a circular handover spot associated with the next Wi-Fi (or other type of interior) AP; and (2) if not, resetting the DR current position of the mobile device to a point on the circular handover spot's outer diameter nearest to the DR current position of the mobile device such that sensor-based DR error or drift is accounted for during the Wi-Fi (or other type of interior) AP handover. The circular handover spot's outer diameter may represent an estimated distance from the next Wi-Fi (or other type of interior) AP at which the handover event between the APs is expected to occur at or approximately at. The method may repeat for each Wi-Fi (or other type of interior) AP handover such that the mobile device's current position is repeatedly checked, and corrected if need be, as the mobile device moves about the interior of a venue.

In another aspect, a computer-implemented method of indoor and/or outdoor navigation may be provided. The method may include, during a handover of a mobile device from one interior AP to a next interior AP, determining whether a dead reckoning (DR) current position of the mobile device is within a predetermined distance of the next interior AP's location; and if not, resetting the DR current position of the mobile device to a point (1) associated with, or within a predetermined distance of, the next interior AP's location, or (2) on an outer diameter/border of a handover spot associated with the next interior AP such that DR error or drift is accounted for at the interior AP handover event. In one embodiment, the interior or indoor APs may be Wi-Fi APs and the handover spot may be circular. For those skilled in the art, the handover spot may be an area that is situated within wireless coverage of two or more APs. The area may be of any shape, but in the vast majority of the cases it may be represented by a circle or oval. The point associated with, or within a predetermined distance of, the next interior AP's location, and/or on the outer diameter/border of the handover spot may represent an estimated location at which the handover event between the interior APs is expected to actually or approximately occur at.

In another aspect, a computer-implemented method of indoor and/or outdoor navigation may be provided. The method may include, during a handover of a mobile device from a current interior AP to a new interior AP, determining whether a dead reckoning (DR) current position of the mobile device is within a predetermined distance of the new interior AP's location; and if not, resetting the DR current position of the mobile device to a point associated with, or within a predetermined distance of, the next interior AP's location such that DR error or drift is accounted for at the interior AP handover event. The point associated with, or within a predetermined distance of, the new interior AP's location may represent an estimated or approximate real-world location at which the handover event between the current interior AP and the new interior AP is expected to approximately occur at. The point associated with the new interior AP's location may be a point on a border of a handover spot associated with the new interior AP that is closet to DR current position of the mobile device. The border of the handover spot may be represented, for example, by a circle for a virtual circular handover spot or a square/rectangle for a virtual square/rectangular handover spot. The APs may be Wi-Fi or other types of wireless communication APs.

Advantages will become more apparent to those skilled in the art from the following description of the preferred embodiments which have been shown and described by way of illustration. As will be realized, the present embodiments are capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed, it being understood, however, that the present embodiments are not limited to the precise arrangements and instrumentalities shown, wherein.

DETAILED DESCRIPTION

Figure 1:
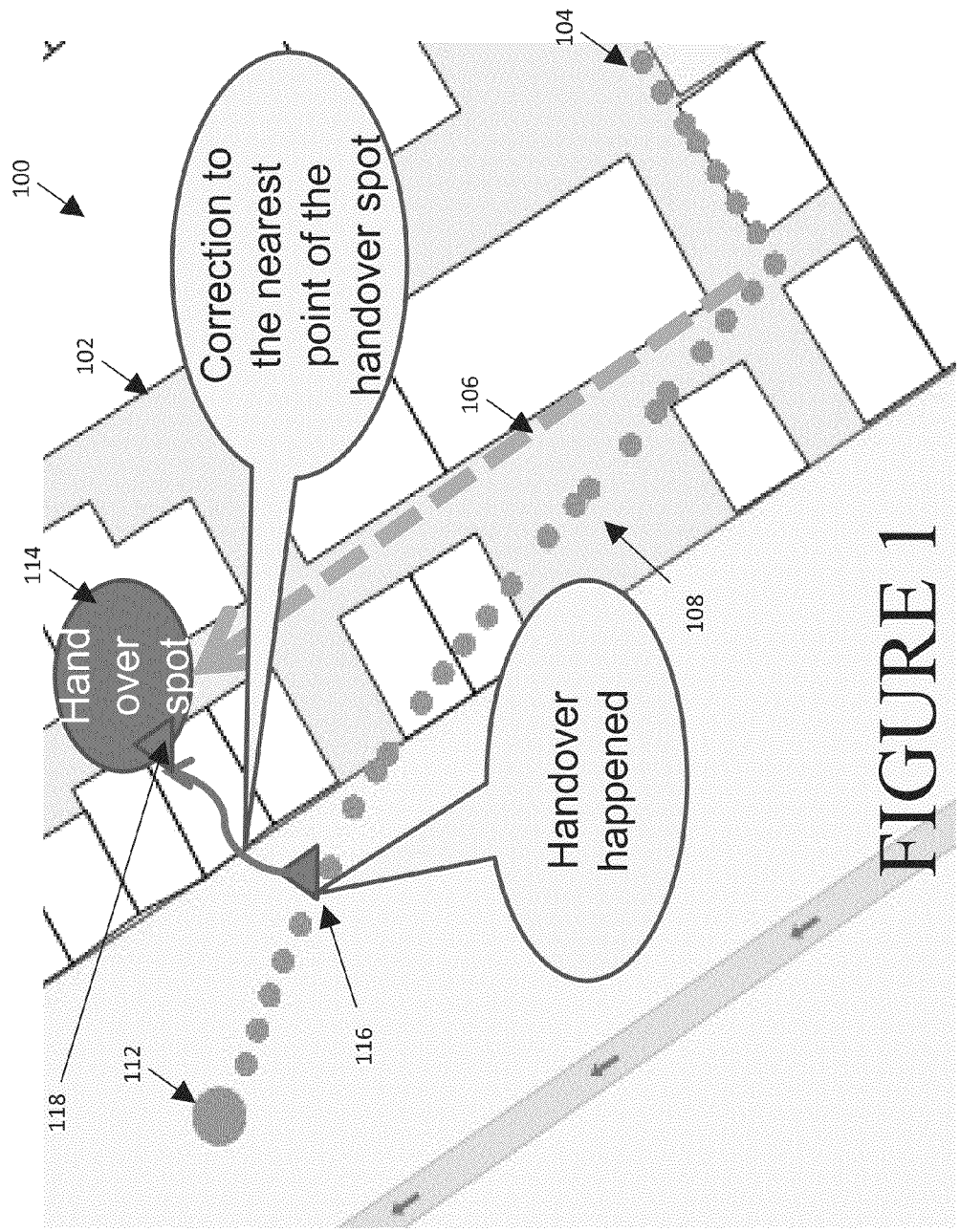
FIG. 1 illustrates an exemplary method of correcting indoor positioning by utilizing Wi-Fi AP handover events.

The present embodiments disclose an apparatus and method that may dynamically correct the dead reckoning (DR) position of a mobile device. For instance, when a mobile device is within an indoor venue, GPS, GNSS, or other satellite signals may be unreliable. The indoor venue, such as a shopping mall, office building, stadium, hotel, convention center, meeting hall, school, hospital, or other facility, may have a number of Access Points (APs) dispersed around its interior. When a mobile device enters a venue, it may switch from GPS-based navigation/positioning to DR-based navigation/positioning. However, DR errors, such as sensors-based errors and/or computational, software, or processing-based errors, may build up rather quickly.

To alleviate DR errors during the indoor navigation of the venue, each time that the mobile device experiences a handover from one AP to a new AP, the mobile device and/or a local network or local network controller associated with the venue may determine whether or not the mobile device's DR-updated position corresponds to the location of the new AP, such as within a predetermined distance, radius, or other threshold of the new AP's location. If the mobile device's DR position does not correspond to the location of the new AP within a predetermined threshold, then the mobile device's DR position may be updated to a position associated with the new AP—such as the new AP's physical location, or preferably an estimated real-world position of where the handover event to the new AP is expected to physically occur at. As a result, the DR position of the mobile device may be continuously checked, and if need be, corrected at each AP handover event as the mobile device moves about and within the venue.

It is noted that some embodiments are discussed herein as being related to indoor navigation. However, the present embodiments may additionally or alternatively relate to outdoor navigation. In other words, the present embodiments may include navigation methods for mobile devices that are indoor, such as inside various venues (and when GPS signals may be unreliable), and/or outdoor, such as in open sky conditions (and when GPS signals may be reliable). The navigation methods may include utilizing indoor AP handover events and/or outdoor AP handover events.

I. Exemplary Indoor Navigation Techniques

In one aspect, the present embodiments may include a technique to improve mobile device sensors-based indoor navigation by utilizing correction references provided by Wi-Fi handover events. The proposed method may use both sensors-based DR and Wi-Fi inter-access point handover.

For indoor navigation with unreliable GPS signals, a mobile device or UE ("user equipment") may use DR techniques to update the mobile device position between fixes that correct for DR error. As the mobile device (and user) moves about an indoor location, such as a shopping mall, the DR position drifts due to sensor error, i.e., gyro or accelerometer error or drift, etc.

Also, as the mobile device (and user) moves about the indoor location, various Wi-Fi Access Points (APs) will be encountered. Handovers from a given Wi-Fi AP to a new Wi-Fi AP may typically occur at, or approximately at, the same distance from the real-world location of the new Wi-Fi AP. In one embodiment, that distance may define the radius of a circular "Handover Spot," and the virtual Handover Spot may be approximated as a circle. During use, the corrected mobile device position may be an intersection of the circular Handover Spot's border/outer diameter and the imaginary line that connects the current mobile device DR position and the Handover Spot's center, which may be the location of a Wi-Fi transmitter.

During handover, if the DR position of the mobile device is determined to be within the circular Handover Spot, no correction of the DR position may be deemed necessary. On the other hand, if the DR position of the mobile device is outside of the circular Handover Spot, i.e., further from the Wi-Fi transmitter than the radius of the circular Handover Spot, then the DR position of the mobile device may be updated to the point on the circular Handover Spot that is nearest to the DR position.

A. Handover Triggered Mobile Device Position Correction

Wi-Fi inter-access point handover may be a procedure during which a Wi-Fi client (e.g., mobile device) may: (1) detect a weakening signal of the current Wi-Fi AP; (2) discover other APs (or Wi-Fi networks) in the neighborhood; (3) connect to another AP (or Wi-Fi network); and/or (4) terminate connection to the current AP.

Typically, Wi-Fi inter-AP handovers from access point A to B occur in the same or approximately the same geo location zone (Handover Area) with a high level of confidence (radius of 2-3 meters). In one embodiment, a Wi-Fi Handover Area may be approximated as a circle and formulized as follows: {first AP bssid, second AP bssid, circle center longitude, circle center latitude, circle radius}—BSSID meaning basic service set identification. In one embodiment, the radius may be automatically approximated as a given distance, such as 1 meter, 2 meters, 3 meters, 4 meters, or other distance from a known AP transceiver or transmitter location. Additionally or alternatively, the radius of each Wi-Fi Handover Area may be determined manually in part by a technician moving about the venue with a mobile device, and reading or otherwise determining the locations at which handover events between APs actually or approximately occur at.

Other formulations or definitions of Wi-Fi Handover Areas may be used, including those with additional, fewer, or alternate components. For example, other geometric shapes may be used instead of a circle to represent handover areas, such as points, ovals, squares, rectangles, or other regular or irregular shapes.

In one aspect, the zone may be described more precisely. For example, the zone may be defined, at least in part, by providing zone borders. The zone borders may be defined as a point, circle of a given radius, oval of given height and length, straight line sides of a square or rectangle, etc.

In run time, the method may be listening for 1) gyro, magnetometer, and accelerometer readings, and 2) Wi-Fi Handover events. As the method receives/recognizes a Wi-Fi handover event, the mobile device implementing the method may check the current DR position and compare it with the Wi-Fi Handover Area associated with the handover event. If the current position according to the dead reckoning is in the same area as the Wi-Fi Handover Area then no correction may be deemed necessary. Otherwise, the correction procedure may be triggered by the method/mobile device.

The correction procedure may correct the current DR position of the mobile device to the nearest point in the Wi-Fi Handover Area. For example, in exemplary case in which the Handover Area is approximated as a circle of a given radius, the corrected position may be an intersection of a circular border and the line that connects the current dead reckoning position and the circle's center. The circle's center may represent the actual location of the Wi-Fi AP transceiver/transmitter.

The corrected position may be more accurate than conventional techniques. The possible error (distance between indicated position and ground true position) of the present embodiments may be less than the fixed Max Error with a high level of confidence. In the exemplary case in which the Wi-Fi Handover Area is approximated as a circle, the Max Error may be equal to the diameter of the circle.

The max possible error before correction may be a sum of the Max Error and the distance between corrected position and the current DR position indicated with only sensors-based dead reckoning. The correction procedure may reduce the max possible error to the value of the distance.

B. Exemplary Handover-Event Mobile Device Position Corrections

FIG. 1 illustrates an exemplary method of correcting indoor positioning by utilizing Wi-Fi or other types of interior AP handover events 100. The user of a mobile device may enter a venue 102 using an initial path 104. Once the mobile device is inside of the venue 102, GPS signals being received by the mobile device may become degraded or otherwise unreliable. The user (and thus the mobile device) may change course as they walk about the venue 102. For instance, the user may change course to travel down a hallway of the venue 102, as shown by actual path 106.

As the mobile device may not be receiving reliable GPS or other satellite signals, the mobile device may attempt to update its current position using DR navigation/positioning techniques. As the user travels down the actual path 106 however, DR-based errors build up over time. The DR-based errors are depicted by the DR path 108 or updated DR position shown in FIG. 1.

As the mobile device travels with the user about the venue 102, various handover events may occur from one AP to the next AP. The venue 102 may have numerous APs dispersed throughout its interior. As shown in FIG. 1, a handover event from one AP to the next AP 116 may occur. The next AP may have a predetermined handover spot 114. The handover spot 114 may, for instance, be defined a circle with a predefined radius from the actual location of the new AP or new AP transceiver. The predefined radius from the location of the new AP may represent real-world locations at which handovers to the new AP for the mobile device are expected to occur at. The predefined radius may be an anticipated radius, expected radius, and/or a guestimated radius, such as 2 or 3 meters, or may be manually determined from a technician walking around the venue and viewing, such as using test or handheld equipment, when handover from one AP to the next AP physically occurs.

The mobile device and/or the new AP may determine whether the DR updated position of the mobile device at the time of the handover event 116 is within the radius of the handover spot 114. If so, no correction to the DR updated or current position of the mobile device may be deemed necessary. On the other hand, if not, then the mobile device and/or the new AP may reset the DR updated or current position of the mobile device to the corrected position 118. The corrected position 118 may be the point on the radius or border of the handover spot 114 that is closest to the DR updated position of the mobile device at the time of the handover event 116.

Thus, the current position of the mobile device may be updated at each handover event, such as to a location associated with, and/or at a distance from, the new AP to alleviate the DR errors continuing to build until the DR updated position of the mobile device greatly deviates from the actual true world position of the mobile device (shown as the uncorrected DR position 112 in FIG. 1). The method may include additional, fewer, or alternate actions, including those discussed elsewhere herein.

II. Exemplary Wireless Communication Environment

Figure 2:
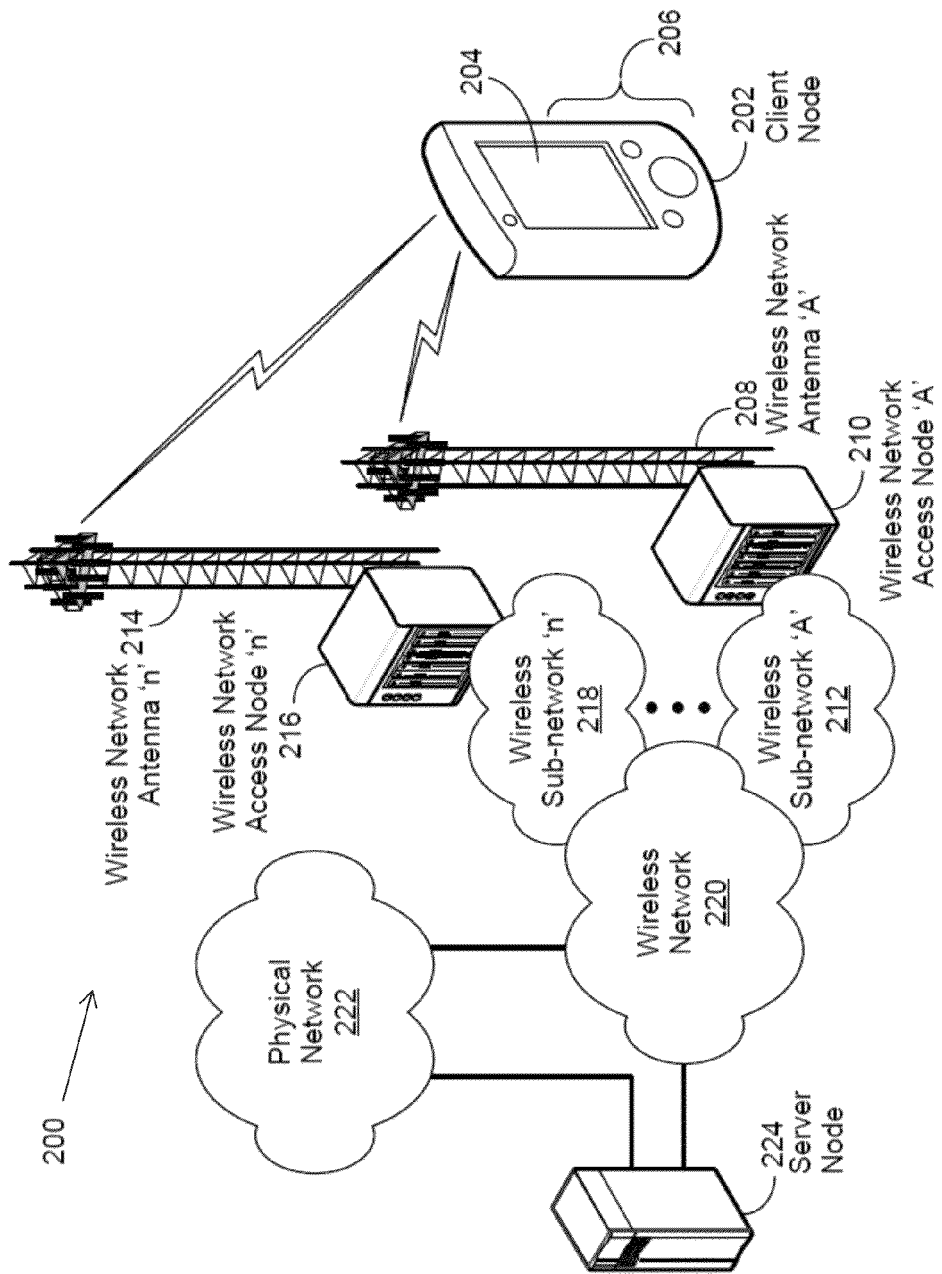
FIG. 2 illustrates an exemplary wireless communication environment.

FIG. 2 shows an exemplary wireless-enabled communications environment. Though illustrated as a mobile phone, the mobile device or client node 202 may take various forms including a wireless handset, smart phone, personal digital assistant (PDA), cell phone, tablet, laptop, notebook, portable computer, smart watch, or other user equipment (UE) or computing device capable of wireless communication. The mobile device 202 may include a display 204 and/or a touch-sensitive surface, a keyboard or other input keys 206 generally used for input by a user. The input keys 206 may likewise be a full or reduced alphanumeric keyboard such as QWERTY, DVORAK, AZERTY, and sequential keyboard types, or a traditional numeric keypad with alphabet letters associated with a telephone keypad. The input keys 206 may include a track wheel, an exit or escape key, a trackball, and other navigational or functional keys, which may be moved to different positions, e.g., inwardly depressed, to provide further input function. The mobile device 202 may present options for the user to select, controls for the user to actuate, and cursors or other indicators for the user to direct. A mobile device with additional, less, or alternate functionality and capabilities may be used.

The mobile device 202 may further accept data entry from the user, including numbers to dial or various parameter values for configuring the operation of the mobile device 202. The mobile device 202 may further execute one or more software or firmware applications in response to user commands. These applications may configure the mobile device 202 to perform various customized functions in response to user interaction. Additionally, the mobile device 202 may be programmed or configured over-the-air (OTA), for example from a wireless network access node 'A' 210 through 'n' 216 (e.g., a base station), or a server node 224 (e.g., a host computer).

Among the various applications executable by the mobile device 202 may be a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained over a connection to the wireless network 220 or any other wirelessly-enabled communication network or system.

In various embodiments, the wireless network 220 may comprise a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. The mobile device 202 may transmit and receive communication signals, which are respectively communicated to and from the wireless network nodes 'A' 210 through 'n' 216 by wireless network antennas 'A' 208 through 'n' 214 (e.g., cell towers). Additionally and alternatively, in lieu of cell towers, the wireless network 220 may include several Wi-Fi and/or WLAN APs.

In turn, the communication signals may be used by the wireless network access nodes 'A' 210 through 'n' 216 to establish a wireless communication session with the mobile device 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 may be coupled to a core network 222, e.g., a global computer network such as the Internet. Via the wireless network 220 and the core network 222, the mobile device 202 may have access to information on various hosts, such as the server node 224. The server node 224 may provide content that may be shown on the display 204 or used by the mobile device processor for its operations. Alternatively, the mobile device 202 may access the wireless network 220 through the access points discussed herein, such as when the mobile device 202 moves from an outdoor to an indoor environment.

III. Exemplary Mobile Device

Figure 3:
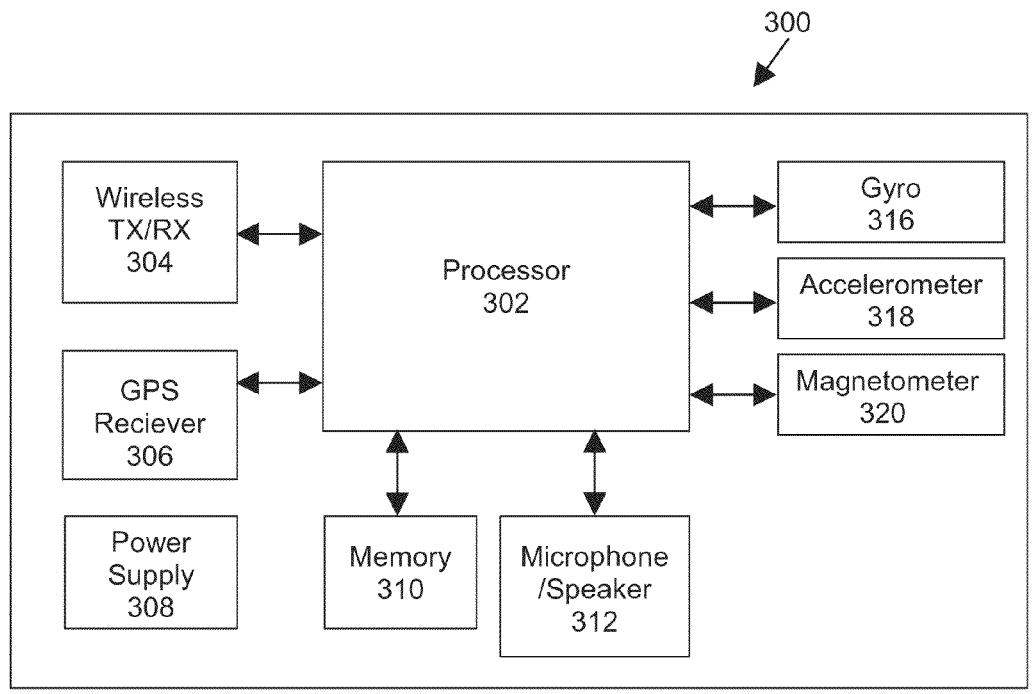
FIG. 3 depicts an exemplary mobile device for use with the present embodiments.

FIG. 3 illustrates an exemplary mobile device 300 capable of employing the indoor navigation/positioning techniques discussed herein. The mobile device 300 may include a processor 302, a Wi-Fi or other wireless radio frequency transmitter and/or receiver 304, a GPS or other satellite receiver 306, a power supply 308, a memory 310, and/or a speaker and microphone 312. The mobile device 300 may further include a gyro 316, an accelerometer 318, a magnetometer 320, and/or other devices/sensors capable performing DR-related functionality, such as direction, speed, and/or altitude functionality. The gyro 316, accelerometer 318, and magnetometer 320 may provide DR-related functionality as one of ordinary skill in the art would understand. The mobile device 300 may include additional, different, or fewer components.

In various embodiments, the processor 302 may be configured to control the various components of the mobile device 300 in accordance with embedded software or firmware stored in memory 310 or stored in memory contained within the processor 302 itself. In addition to the embedded software or firmware, the mobile device 300 may execute other applications stored in the memory 310 or made available via information media such as portable data storage media like a removable memory card or via wired or wireless network communications. The application software may comprise a compiled set of machine-readable instructions that configure the processor 302 to provide the desired functionality, including the indoor navigation related functionality discussed herein, or the application software may be high-level software instructions to be processed by an interpreter or compiler to indirectly configure the processor 302.

The wireless transmitter/receiver 304 may be provided to convert between wireless signals and electrical signals, enabling the mobile device 300 to send and receive information from a cellular network or some other available wireless communications network, such as a local network associated with a venue, or from a peer mobile device 300. In some embodiments, the communication may provide Internet connectivity, enabling a user to gain access to content on the Internet and to send and receive e-mail or text messages. The mobile device may include a short range wireless communication sub-system that may include an infrared port, a Bluetooth interface, an IEEE 802.11 compliant wireless interface, or any other short range wireless communication sub-system, which may enable the mobile device 300 to communicate wirelessly with other nearby mobile devices, access nodes, and/or access points, including Wi-Fi or other types of interior APs. The short-range wireless communication sub-system may also include suitable RF transceivers, antennas, and/or front-end subsystems.

In one embodiment, the mobile device 300 may be configured to, during a handover of a mobile device from a current AP to a next AP, (a) determine whether a DR current position of the mobile device 300 is within a radius of a circular handover spot associated with the next AP; and (b) and if not, then reset the DR current position of the mobile device 300 to a point on the circular handover spot nearest to the DR current position such that DR error is accounted for at the AP handover event. As the mobile device 300 moves about an indoor or outdoor venue or other location, the DR current position of the mobile device 300 may be updated via DR-related sensors, such as the gyro 316, accelerometer 318, magnetometer 320, and/or other sensors that provide DR-related information, including speed and/or direction information. The APs may be indoor and/or outdoor APs, and the AP handover events may be indoor and/or outdoor handover events.

In another embodiment, the mobile device 300 may be configured to, during a handover of a mobile device from a current indoor AP to a next indoor AP, (a) determine whether a DR current position of the mobile device 300 is within a threshold distance of the next indoor AP; and (b) and if not, then reset the DR current position of the mobile device 300 to a point associated with the next indoor AP such that DR error is accounted for at the indoor AP handover event. The point associated with the next indoor AP may be an estimate of where, or approximately where, the indoor AP handover event is expected to occur at within a venue, as discussed herein. Alternatively, the indoor APs mentioned above may be outdoor APs, i.e., APs located outdoors and/or in open sky conditions.

In another embodiment, the mobile device 300 may include, during a handover of a mobile device 300 from one indoor AP (currently providing the mobile device access to local venue network) to a next indoor AP, means for determining whether a dead reckoning (DR) current position of the mobile device 300 is within a predetermined distance of the next indoor AP's location; and if not, means for resetting the DR current position of the mobile device 300 to (1) a point associated with, or within a predetermined distance of, the next indoor AP's location; (2) a point on or within a radius of a circular handover spot associated with the next indoor AP; (3) a point on or within a border of a handover spot associated with the next indoor AP; and/or (4) a point determined using the DR current position of the mobile 300 and/or the next indoor AP's location—such that DR error is accounted for at the AP handover event. Alternatively, the indoor APs mentioned above may be outdoor APs, i.e., APs located outdoors, in the vicinity of outdoor locations, and/or in open sky conditions. In one embodiment, the "means for determining" and/or "means for resetting . . . " discussed above may include a processor 302 programmed to perform the respective functionality and/or computer instructions stored on a non-transitory memory unit 310 that relate to instructing the processor 302 to perform the respective functionality on the mobile device 300.

The interior or indoor access points (APs) discussed herein may include Wi-Fi APs, nodes, access nodes, local nodes, pico nodes, hotspots, routers, bridges, repeaters, eNB's, homenodeB's, non-Wi-Fi APs, and/or other wireless communication devices that may connect a mobile device to a remote or local network via wireless communication, including wireless local access networks (WLANs). Preferably, the interior or indoor APs are Wi-Fi APs. The interior or indoor APs may be configured to wirelessly communicate with mobile devices using Institute of Electrical and Electronic Engineers (IEEE) 802.11 wireless communications standards, such as via IEEE 802.11a/b/g/n/ad connectivity. Other wireless communication standards and techniques may be used.

IV. Exemplary Indoor Arrangement

Figure 4:
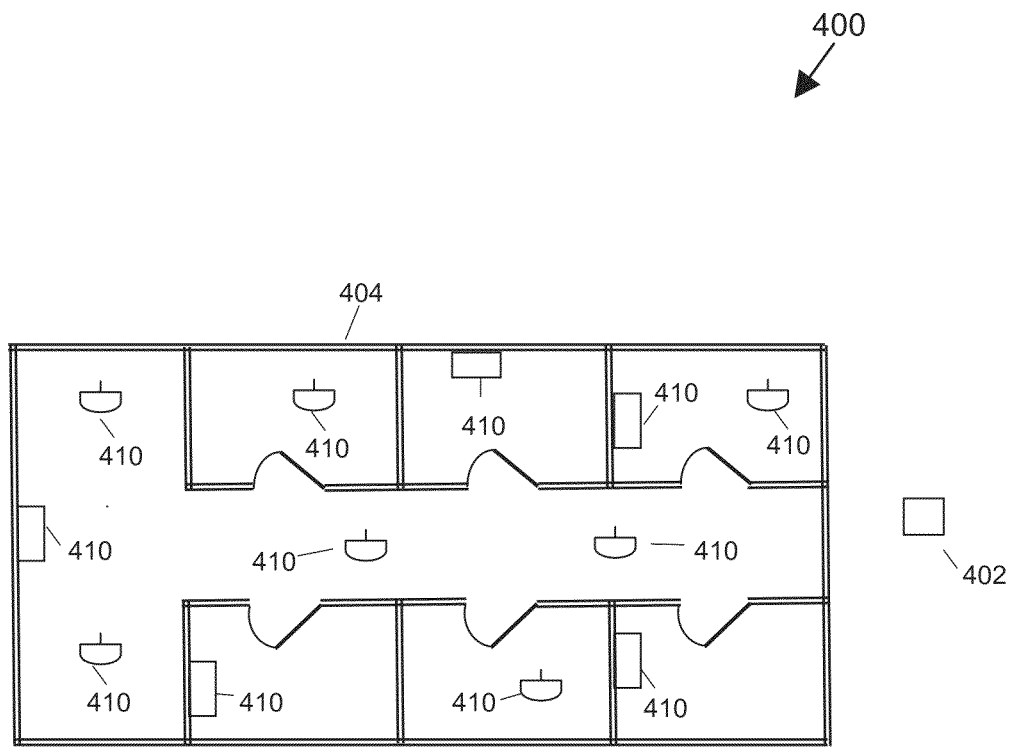
FIG. 4 illustrates an exemplary indoor wireless communication arrangement.

The present embodiments may be used with indoor and/or outdoor wireless communication arrangements. For one indoor embodiment, FIG. 4 illustrates an exemplary indoor wireless communication arrangement 400. The indoor wireless communication arrangement 400 may be associated with a venue 404 in which GPS or other satellite positioning signals are unreliable or degraded. The indoor wireless communication arrangement 400 may include a number of APs 410, such as Wi-Fi APs, WLAN APs, LTE eNodeB's, home eNodeB's (i.e., LTE NodeB's located in a home or small business), APs associated with a macrocell or base station, APs associated with Hotspots, relay nodes, access nodes, other type of APs or nodes, and/or other entities or devices capable of wireless communication.

As a user with a mobile device 402 moves about the interior of the venue 404, the mobile device 402 may update its locally determined current position via DR techniques and DR sensors, as well as experience a number of handover events from one AP 410 to the next AP 410. At each handover event, the mobile device 402 and/or a local network controller associated with the venue 404 may check whether the mobile device's 402 current position, that is being updated via DR techniques, corresponds to a location associated with the next or new AP 410, such as a location at which handover is expected to actually or approximately occur at. If not, the mobile device 402 and/or local network controller may reset the mobile device's 402 current position to a location associated with the next or new AP 410, as discussed elsewhere herein.

As a user with a mobile device 402 moves about the interior of the venue 404, the mobile device 402 may update its locally determined current position via DR techniques and DR sensors, as well as experience a number of handover events from one AP 410 to the next AP 410. At each handover event, the mobile device 402 and/or a local network controller associated with the venue 404 may check whether the mobile device's 402 current position, that is being updated via DR techniques, corresponds to a location associated with the next or new AP 410, such as a location at which handover is expected to actually or approximately occur at. If not, the mobile device 402 and/or local network controller may reset the mobile device's 402 current position to a location associated with the next or new AP 410, as discussed elsewhere herein.

In the example shown in FIG. 4, each AP 410 may be associated with a hallway or a rectangular room or store within the venue 404. At the handover event, if the current position of the mobile device 402 is not within a predetermined border, such as a border defined by four walls of a rectangular store, then the mobile device 402 and/or local network may determine that the current DR-based position of the mobile device 402 needs to be corrected. The correction may be to a border of the new AP-based area or even within the new AP-based area. Thus, as the mobile device 402 moves about the interior of the venue 404, at each handover event, the current position of the mobile device 402 may be updated to a position associated with each next AP if need be, and in between handover events, the mobile device 402 may update its position using DR-based techniques. Additionally or alternatively, the predetermined border for each AP 410 may be a circular handover spot, as discussed elsewhere herein, or other shape.

As mentioned above, the present embodiments may also be used with outdoor wireless communications arrangements. For instance, GPS navigation techniques may be accurate during open sky conditions. However, GPS navigation techniques may be "power hungry," i.e., consume a relatively large amount of battery power. Thus, the present embodiments and/or DR navigation techniques discussed herein may be used instead of GPS navigation techniques during open sky or outdoor conditions, such as to conserve battery power. Alternatively, the present embodiments and/or DR navigation techniques discussed herein may be used in conjunction with GPS navigation techniques, such as using GPS fixes only periodically to update DR position in order to conserve battery power.

A processor on the mobile device may determine when it is desirable to conserve battery power, such as when battery power drops below a certain threshold. At which point, the mobile device may switch to DR navigation techniques that use no, or only limited, GPS signal position information. For instance, the processor may determine not to utilize any GPS signals during navigation, or the processor may determine to utilize GPS signals only periodically to update the current DR position to a GPS-based fix. Other techniques of conserving battery power may be used.

V. Exemplary Method

Figure 5:
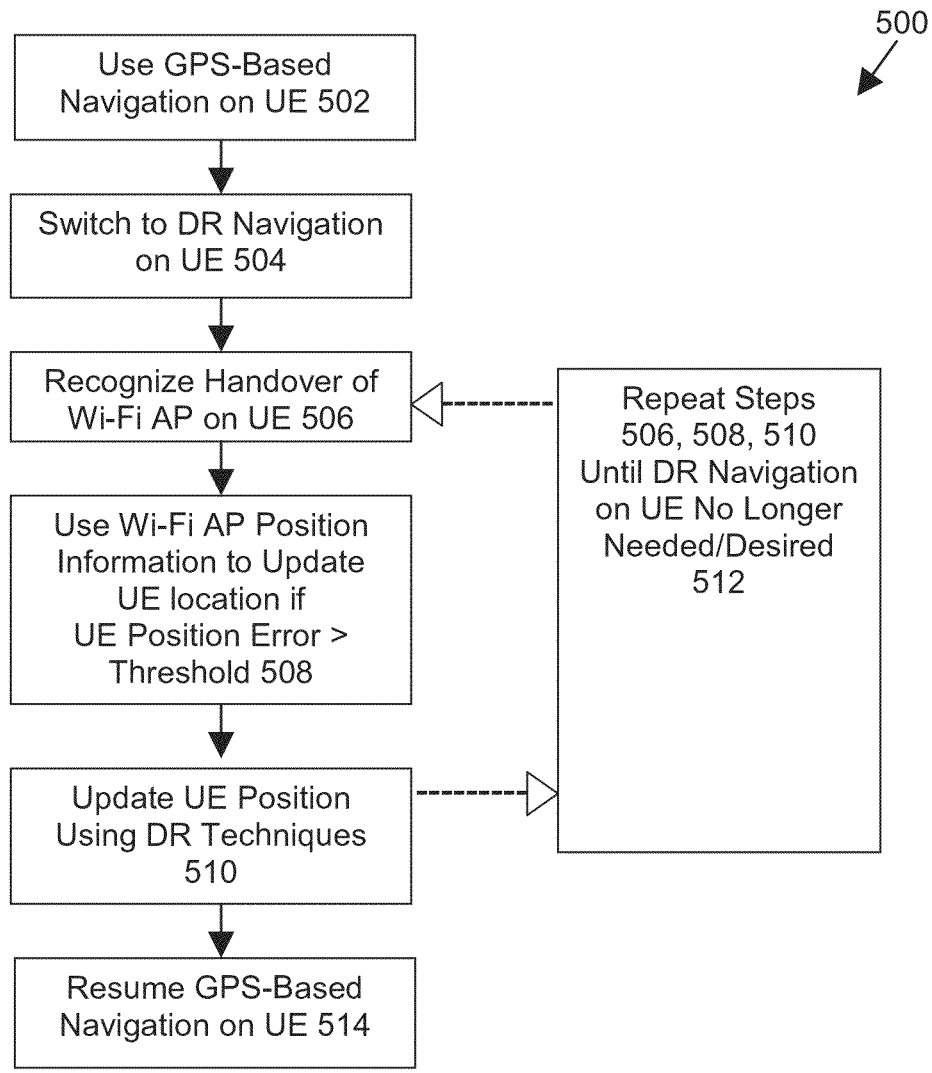
FIG. 5 illustrates an exemplary method of correcting indoor positioning by utilizing AP handover events.

FIG. 5 illustrates an exemplary method of correcting indoor positioning by utilizing handover events, such as Wi-Fi or other types of interior handovers 500. The method 500 may include using GPS-based navigation or positioning on a mobile device or user equipment (UE) 502, switching to DR sensor-based navigation or positioning on the mobile device or UE 504, recognizing a handover event from one AP to the next AP at the mobile device or UE 506, using the AP position information to update the current mobile device or UE location if the mobile device or UE position error is greater than a predetermined threshold 508, updating the mobile device or UE position using DR-based techniques 510, repeating steps 506, 508, and/or 510 as the user moves about 512, and/or resuming GPS-based navigation or positioning once GPS signals become reliable again 514. The method may include additional, fewer, or alternate actions.

The method 500 may include using GPS-based navigation or positioning on the mobile device or UE 502. During "open sky" conditions, the mobile device may receive reliable GPS or other satellite positioning signals. The mobile device may use the GPS signals to provide navigation information to a user. For instance, the mobile device may have one or more navigation applications that display a virtual map on a display screen and move an icon representing the user location around the virtual map based upon the received GPS signals.

The method 500 may include switching to DR sensor-based navigation or positioning on the mobile device or UE 504. For instance, in one embodiment, the mobile device may switch to DR navigation when the user enters the interior of a venue. In one aspect, the mobile device may determine when GPS or other satellite positioning signals become unreliable or degraded, such as by measuring or recognizing a high Dilution of Precision (DOP), and then may switch to DR sensor-based navigation. Alternatively, the mobile device may switch to DR navigation to conserve battery power, and may be either outdoors or indoors. The mobile device's navigation applications that display a virtual map may move the icon representing the user location around the virtual map based upon signals received from the DR sensors, such as a gyro, accelerometer, speed sensor, direction sensor, etc.

The method 500 may include recognizing a handover event from one AP to the next AP at the mobile device or UE 506. In one embodiment, a handover event from an indoor AP currently providing the mobile device access to a local network of the venue to a next AP within the venue may occur as the mobile device moves about the venue. In another embodiment, a handover event may be from an outdoor AP currently providing the mobile device access to a network to a next outdoor AP as the mobile device moves about an outdoor area. The mobile device or AP may recognize that the handover event is about to or has occurred, and use the handover event as a trigger to check the accuracy of the DR updated current location of the mobile device.

The method 500 may include using the AP position information to update the current mobile device or UE location if the mobile device or UE position error is greater than a predetermined threshold 508. The mobile device (and/or a local network controller associated with the AP or venue) may determine whether the mobile device's DR position is within (1) a handover spot, (2) a radius of a handover spot, (3) a distance of the AP transceiver/transmitter location, and/or (4) other distances associated with the AP, including the distances discussed herein. For instance, if the current position is outside of (a) the borders of the handover spot, (b) a radius of the handover spot, and/or (c) the threshold distance to the AP transceiver/transmitter location, the mobile device may reset or update its position. Alternatively, the local network, local network controller, or the AP may remotely determine that the mobile device DR position needs to be corrected, and send a correction signal or command to the mobile device. AP related position information, such as radius and location of handover spots, radius and location of AP transmitters, and/or distances from an AP transmitter location at which handovers are expected to occur at may be sent to and stored on the mobile device and/or stored at the AP or local venue controller.

The method 500 may, after determining whether DR position needs to be corrected during a handover event, include updating the mobile device or UE position using DR-based techniques 510. For example, the mobile device may update its current position via DR sensor-based techniques.

The method 500 may include repeating steps 506, 508, and/or 510 as the user moves about the interior of a venue or about an outdoor location/area 512. Thus, at each handover event, the mobile device (and/or local network or AP) may check the DR-updated position of the mobile device, and if correction is needed, update the DR-updated position to a position closer to, and/or associated with, the new AP.

The method 500 may include resuming GPS-based navigation or positioning once the user exits the venue, GPS signals become reliable again, and/or battery power is no longer desired to be conserved 514. For example, the mobile device may resume navigation techniques that use GPS-based signals when DOP or other indicators indicate that GPS signals are reliable.

VI. Exemplary Mobile Device Implemented Method

Figure 6:
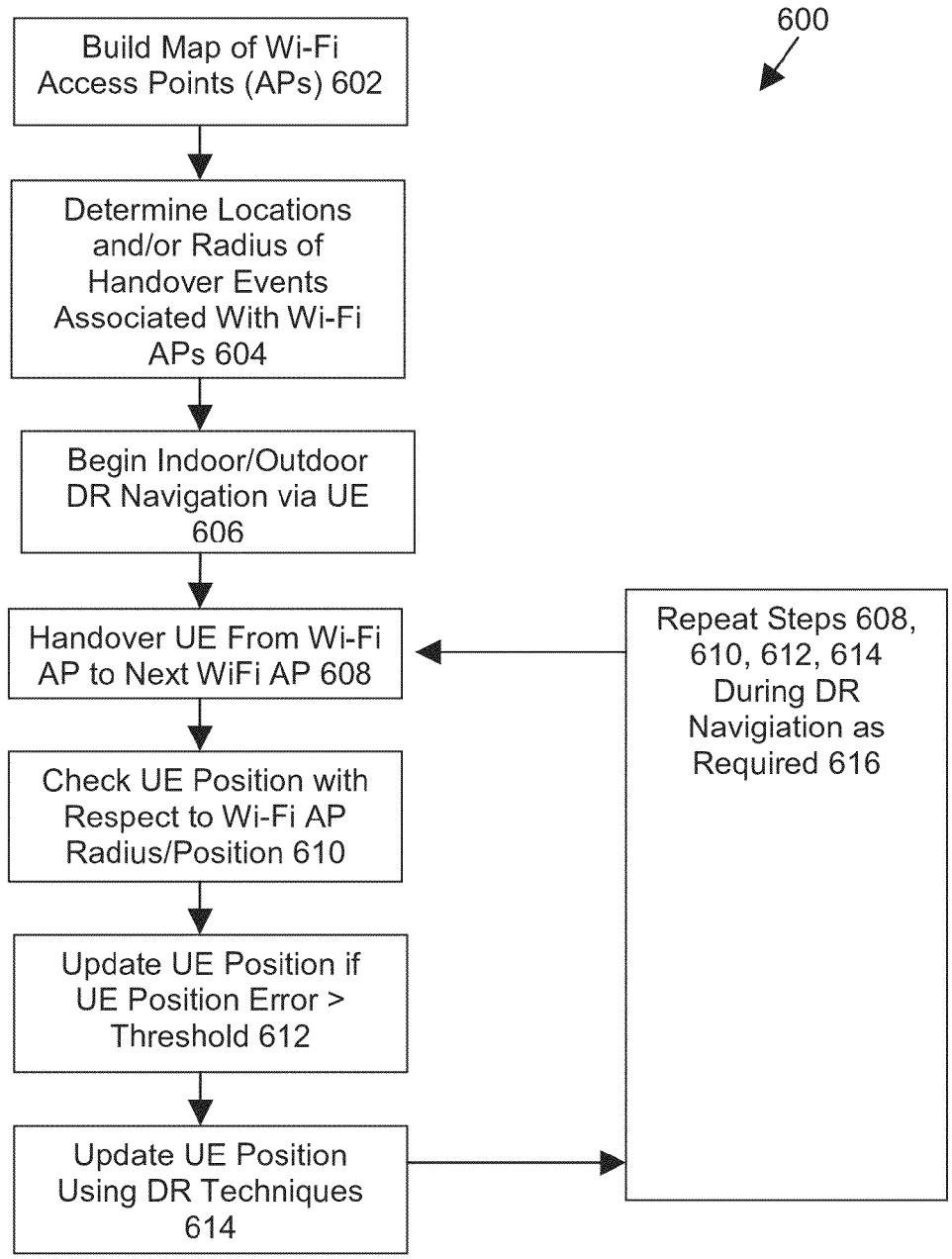
FIG. 6 illustrates another exemplary method of correcting indoor positioning by utilizing AP handover events.

FIG. 6 illustrates another exemplary method of correcting positioning by utilizing Wi-Fi or other types of handover events 600. The method 600 may include building a map of APs 602, determining a radius for handover events associated with the APs 604, beginning DR navigation via the mobile device or UE 606, handing over the UE from one AP to the next AP 608, checking the UE position with respect to the AP radius or other AP associated position 610, updating the UE position if the UE position error is greater than a threshold 612, updating the UE current position using DR techniques 614, and/or repeating steps 608, 610, 612, 614 until DR navigation techniques are no longer required 616. The method may include additional, fewer, or alternate actions, including those discussed elsewhere herein.

The method 600 may include building a map of APs 602. The map of APs may be a virtual map that may be transmitted to the mobile device, such as when the mobile device enters a venue or an outdoor location/geographical area (such as a city, town, village, plaza, city plaza or downtown area, stadium, campus, fair, amusement park, street, park, outdoor market, tourist attraction (such as the Magnificent Mile or Grant Park in Chicago, Times Square in New York City, historical downtown Boston, the World's Fair, Six Flags, etc.), outdoor mall, or other outdoor venue), preloaded to the mobile device prior to entering the venue or vicinity of the area, and/or available via the Internet or a website associated with the venue or geographical area.

The maps of expected handover points may be based upon existing maps of APs. For instance, a map of APs dispersed within the interior of a venue or spaced about an outdoor location may be built manually, such as by a technician walking around the venue or outdoor location with a mobile device and the mobile device detecting the location of each AP transceiver/transmitter, and/or by manually or automatically entering the coordinates of the AP transceiver into a database, etc.

The map of APs may be additionally or alternatively automatically built, such as by triangulation and/or fingerprint techniques, or from software blueprints or CAD (computer aided design) floor plans of a venue's or an outdoor area's AP locations. An actual or GPS position may be entered or associated with one or more AP transceivers, and the one or more known AP locations may be used to populate a map of locations of all APs within the indoor or outdoor venue and/or newly added APs within the venue using triangulation techniques. For instance, if the AP transceivers/transmitters wirelessly communicate with one another, using two known AP locations, a location of a third AP may be determined by bearing, direction, and/or other information.

Once the map of all known AP locations is entered into a data structure or database, an expected location of handover events between the APs may be estimated or manually determined. In one aspect, the method 600 may include determining a radius of circular handover areas associated with the APs 604. Additionally or alternatively, this step may include determining the other types of handover areas or location(s) at which handover events are expected to occur at from one AP to the next AP. The APs may be indoor and/or outdoor APs.

For each AP location, an expected distance from the AP transceiver at which a handover occurs from another AP for a mobile device may be determined. For instance, as noted above, the expected distance may be determined by manually walking around the venue with a mobile device and monitoring where handover events between various APs occur. The locations of the handover events may be stored in a database or data structure for later use with the present embodiments. Additionally or alternatively, the locations of the handover events may be automatically determined based upon (a) the signal strength at which each AP transmitter is transmitting at or is expected to be transmitting at; (b) the distance between AP transmitters; (c) the number of AP transmitters that may be seen from a given location; (d) the geometry of the area that the AP transmitter is situated in (square room, hallway, open area, etc.); (e) the local transmission and/or reception environment; and/or other wireless communication related factors.

The expected handover distance from an AP transceiver may lead to the estimation of an expected handover location associated with the AP transceiver. By knowing the real-world latitude, longitude, and altitude coordinates of the AP transceiver (or relative coordinates within the venue) and moving the expected handover distance from the AP transceiver in the direction at which the mobile device is approaching from may lead to the expected handover location associated with the AP transceiver. If it is determined during use that the mobile device's DR position needs to be corrected at a handover event, then the mobile device's DR position may be updated to, or approximately to, the expected handover location.

As shown in FIG. 6, the method 600 may further include beginning indoor or outdoor DR navigation via the mobile device or UE 606 when GPS signals are degraded or are not desired to be used (such as to conserve UE battery power), handing over the UE from one AP to the next AP 608, checking the UE position with respect to the AP radius or other AP associated position 610, updating the UE position if the UE position error is greater than a threshold 612, updating the UE current position using DR techniques 614, and/or repeating steps 608, 610, 612, 614 until DR navigation techniques are no longer required 616—as discussed with above with respect to FIG. 5 and elsewhere herein. The method may be primarily implemented in real time at the mobile device, such as steps 610, 612, and 614 may be performed by the mobile device.

VII. Exemplary Network Implemented Method

Figure 7:
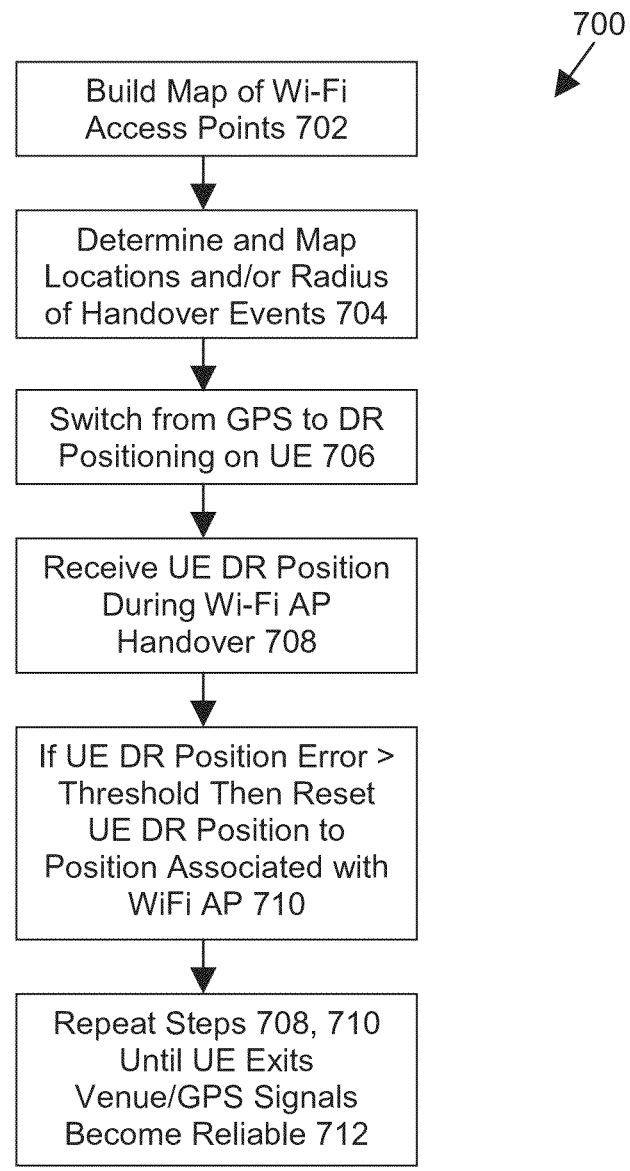
FIG. 7 illustrates another exemplary method of correcting indoor positioning by utilizing AP handover events.

FIG. 7 illustrates another exemplary method of correcting DR positioning by utilizing Wi-Fi or other types of interior handover events 700. As discussed elsewhere herein, the method 700 may include (a) building a map of APs 702; (b) determining and mapping locations and/or a radius of handover events 704; (c) switching from GPS positioning to DR positioning on the mobile device 706, such as when the mobile device enters a venue or when battery conservation is desired; (d) receiving a UE DR position during an AP handover 708 at the AP and/or local network controller associated with a venue; (e) if UE DR position error is greater than a threshold, then resetting the UE DR or current position to a position associated with the AP 710 via a command or other signal sent from the AP and/or local network controller to the mobile device; and/or (0 repeating steps at 708 and 710 at the AP or local network controller until the UE exits the venue or GPS signals are desired to be used 712. Steps 708, 710, 712 relating to DR position correction may be performed on the network side in whole or in part. Additionally or alternatively, the DR position correction may be performed at the mobile device in whole or in part. The method may include additional, fewer, or alternate actions, including those discussed elsewhere herein.

In one specific embodiment, a computer-implemented method of dead reckoning (DR) navigation may be provided. The method may include, during a handover of a mobile device from one Access Point (AP) to a new AP within an indoor or outdoor venue (and at which GPS signals are degraded or not desired to be used), determining whether a DR current position of the mobile device is within a predetermined distance of the new AP; and if not, resetting the DR current position of the mobile device to a point associated with the new AP such that DR error or drift is accounted for at the AP handover event. Determining whether the DR current position of the mobile device is within a predetermined distance of the new AP may entail determining whether the DR current position of the mobile is within a border of a handover spot associated with the next AP. The handover spot may be a circular handover spot, and a border of the handover spot may be a radius around of an actual location of the next AP at which a handover event of the mobile device from the one AP to the new AP is expected to approximately or actually occur at. The radius of the handover spot may be 2 or 3 meters from the location of the AP transceiver or transmitter. The handover spot may alternatively be a square or rectangular handover spot, and a border of the handover spot may be represented by a square or rectangle around of an actual location of the next AP at which a handover event of the mobile device from the one AP to the new AP is expected to approximately or actually occur at. The new AP may be a Wi-Fi AP and a virtual map of locations at which handovers from one AP the next occur may be automatically estimated from existing maps of AP locations of a venue. Determining whether the DR current position of the mobile device is within a predetermined distance of the new AP may be performed at, or primarily performed at, the mobile device. Alternatively, determining whether the DR current position of the mobile device is within a predetermined distance of the new AP may be performed at, or primarily performed at, a local network controller associated with the venue, and if not, the local network controller may send a command to the mobile device to correct its DR current position to a position at which handover to the new AP is expected to approximately or actually occur at.

As indicated above, the APs may be indoor and/or outdoor situated APs. The APs may be Wi-Fi APs, WLAN APs, LTE eNodeB's, home eNodeB's, APs associated with a macrocell or base station, APs associated with Hotspots, relay nodes, access nodes, other type of APs or nodes, and/or other entities or devices capable of wireless communication.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method of mobile device dead reckoning (DR) navigation, the method comprising:
   determining that a handover of a mobile device from one Access Point (AP) to a next AP is occurring;
   determining a border of a handover spot associated with the next AP;
   obtaining a DR current position of the mobile device;

determining that the DR current position of the mobile device is outside the border; and resetting the DR current position of the mobile device to a point on the handover spot's border nearest to the DR current position of the mobile device such that sensor-based DR error or drift is accounted for during the interior AP handover.

2. The method of mobile device DR navigation of claim 1, wherein the one AP and the next AP are Wi-Fi APs, WLAN APs, or Long Term Evolution (LTE) eNodeB's.

3. The method of mobile device DR navigation of claim 1, wherein the handover spot is circular, and the handover spot's border is located at an estimated distance from the next AP at which the handover event between the one interior AP and the next AP is expected to occur.

4. The method of mobile device DR navigation of claim 1, wherein the method repeats at each AP handover event within an indoor or outdoor venue such that the mobile device's current position is repeatedly checked and corrected if need be as the mobile device moves about the venue.

5. The method of mobile device DR navigation of claim 1, wherein the method is performed when GPS signals received by the mobile device are determined by the mobile device to be deeraded.

6. The method of claim of 1, wherein the method is performed by the mobile device when GPS signals are not desired to be used for navigation to conserve battery power.

7. A computer-implemented method of navigation, the method comprising:
determining that a handover of a mobile device from one Access Point (AP) to a new AP is occuring,
obtaining a dead reckoning (DR) current) position of the mobile device;
determining that the DR current position of the mobile device is beyond a predetermined distance of the new AP; and
resetting the DR current position of the mobile device to a point associated with the new AP such that DR error or drift is accounted for at the AP handover event.

8. The method of claim 7, wherein determining that the DR current position of the mobile device is beyond a predetermined distance of the new AP entails determining whether the DR current position of the mobile is within a border of a handover spot associated with the next AP.

9. The method of claim 8, wherein the handover spot is a circular handover spot, and a border of the handover spot is a radius around an actual location of the next AP at which a handover event of the mobile device from the one AP to the new AP is expected to occur.

10. The method of claim 9, wherein the radius of the handover spot is within 5 meters from the location of the AP transceiver or transmitter.

11. The method of claim 9, wherein a virtual map of locations at which handovers from one AP the next are automatically estimated from existing maps of AP locations of a venue, the venue being an indoor or outdoor venue.

12. The method of claim 8, wherein the handover spot is a square or rectangular handover spot, and a border of the handover spot is represented by a square or rectangle around of an actual location of the next AP at which a handover event of the mobile device from the one AP to the new AP is expected to occur.

13. The method of claim 7, wherein the new AP is a Wi-Fi AP, WLAN AP, or a Long Tenn Evolution (LTE) eNodeB.

14. The method of claim 7, wherein determining whether the DR current position of the mobile device is within a predetermined distance of the new AP is performed at the mobile device.

15. The method of claim 7, wherein determining whether the DR current position of the mobile device is within a predetermined distance of the new AP is performed at a local network controller associated with a venue, and if not, the local network controller sends a command to the mobile device to correct its DR current position to a position at which handover to the new AP is expected to occur.

16. A computer-implemented method of navigation, the method may comprise:
determining that a handover of a mobile device from one AP to a next AP is occurring,
obtaining a dead reckoning (DR) current position of the mobile device;
determining that the DR current position of the mobile device is beyond a predetermined distance of the next AP's location; and
resetting the DR current position of the mobile device to a (a) point associated with, or within a predetermined distance of, the next AP's location, or (b) a radius of a circular handover spot associated with the next AP such that DR error or drift is accounted for at the AP handover event.

17. The method of claim 16, wherein the interior APs are Wi-fi APs, WLAN APs, or Long Term Evolution (LTE) eNodeBs.

18. The method of claim 16, wherein the point associated with, or within a predetermined distance of, the next AP's location, and/or the radius of a circular handover spot represents an estimated location at which the handover event between the APs is expected to occur.

19. The method of claim 16, wherein determining that the DR current position of the mobile device is beyond the predetermined distance of the next AP's location is performed at the mobile device.

20. The method of claim 16, wherein determining that the DR current position of the mobile device is beyond the predetermined distance of the next AP's location is performed at a local network controller associated with an indoor or outdoor venue.

* * * * *

UNITED STATES PATENT AND TRADEMARK OFFICE
CERTIFICATE OF CORRECTION

| | | |
|---|---|---|
| PATENT NO. | : 9,332,476 B2 | Page 1 of 1 |
| APPLICATION NO. | : 14/045858 | |
| DATED | : May 3, 2016 | |
| INVENTOR(S) | : Alexander Shatsky and Alexandre Kouznetsov | |

It is certified that error appears in the above-identified patent and that said Letters Patent is hereby corrected as shown below:

In the claims,

Column 15, line 24, in claim 5, please delete "deeraded" and insert --degraded--.

Column 15, line 32, in claim 7, please delete ")" after the word "current".

Column 16, line 10, in claim 13, please delete "Tenn" and insert --Term--.

Signed and Sealed this
Nineteenth Day of July, 2016

Michelle K. Lee
*Director of the United States Patent and Trademark Office*